United States Patent
Hellwig et al.

(10) Patent No.: US 9,204,276 B2
(45) Date of Patent: Dec. 1, 2015

(54) RELAYING A PRIVATE EMERGENCY POINT TO A PUBLIC EMERGENCY POINT

(75) Inventors: Karl Hellwig, Wonfurt (DE); Carl Anders Fagerholt, Molndal (SE); Timo Helin, Herzogenrath (DE); Matthias Nolle, Heerlen (NL)

(73) Assignee: TELEFONAKTIEBOLAGET L M ERICCSON (PUBL), Stockholm (SE)

( * ) Notice: Subject to any disclaimer, the term of this patent is extended or adjusted under 35 U.S.C. 154(b) by 69 days.

(21) Appl. No.: 13/981,838

(22) PCT Filed: Jan. 26, 2011

(86) PCT No.: PCT/EP2011/051067
§ 371 (c)(1),
(2), (4) Date: Jul. 25, 2013

(87) PCT Pub. No.: WO2012/100826
PCT Pub. Date: Aug. 2, 2012

(65) Prior Publication Data
US 2013/0309994 A1    Nov. 21, 2013

(51) Int. Cl.
*H04W 4/22* (2009.01)
*H04W 76/00* (2009.01)

(52) U.S. Cl.
CPC .............. *H04W 4/22* (2013.01); *H04W 76/007* (2013.01)

(58) Field of Classification Search
CPC ...... H04W 84/12; H04W 4/22; H04W 76/007
USPC .......................... 455/403–404.2, 456.1–456.6
See application file for complete search history.

(56) References Cited

U.S. PATENT DOCUMENTS

| | | | |
|---|---|---|---|
| 6,636,732 B1 * | 10/2003 | Boling et al. | 455/404.1 |
| 7,330,710 B1 * | 2/2008 | Xu et al. | 455/404.1 |
| 2002/0103622 A1 * | 8/2002 | Burge | 702/183 |
| 2006/0234727 A1 | 10/2006 | Ashley et al. | |
| 2007/0287409 A1 | 12/2007 | Hwang | |
| 2009/0311988 A1 | 12/2009 | Johannesson et al. | |
| 2010/0002846 A1 | 1/2010 | Ray et al. | |
| 2011/0111728 A1 * | 5/2011 | Ferguson et al. | 455/404.2 |

OTHER PUBLICATIONS

3GPP TS 26.267 V9.2.0, Dec. 2010, 3rd Generation Partnership Project; Technical Specification Group Services and System Aspects; eCall Data Transfer; In-band modem solution; General description (Release 9), Global System for Mobile Communications, 36 pages.

(Continued)

*Primary Examiner* — Ajit Patel
(74) *Attorney, Agent, or Firm* — Rothwell, Figg, Ernst & Manbeck, P.C.

(57) ABSTRACT

The invention relates to a method for relaying, by an in-vehicle emergency system, a private emergency point of the vehicle to a public emergency point that is handling an emergency of the vehicle in which the in-vehicle emergency system is incorporated, the public emergency point depending on the location of the emergency. The method comprises the steps of receiving a message from a call control node of a mobile communications network in response to an emergency call initiated by the in-vehicle emergency system, the message containing contact information of the public emergency point, and transmitting the received contact information of the public emergency point to the private emergency point.

14 Claims, 5 Drawing Sheets

(56) References Cited

OTHER PUBLICATIONS

Ericsson, "eCall via SMS, a Technical Analysis" Oct. 2008, 11 pages.
Ericsson, "eCall: Inband? eSMS" 3GPP/SA4, Nov. 2010, 17 pages.
Telefon AB LM Ericsson, ST-Ericsson SA, Attachment to S4-100940 eCall—Remarks, Questions and Alternative, Test Case 1: PUSH in Version 9.3.0, Nov. 2010, 2 pages.
Telefon AB LM Ericsson, ST-Ericsson SA, Attachment to S4-100940 eCall—Remarks, Questions and Alternative, Example PUSH-quickly-Pull-930, Nov. 2010, 2 pages.
3GPP TSG-SA4 #61, Nov. 2010, Tdoc S4-100940, Telefon AB LM Ericsson, ST-Ericsson SA, eCall: Remarks, Questions and Alternative, 12 pages.
CEN/TC 278, Jan. 2010, Intelligent transport systems—Esafety—Third Party Services supported eCall—Operating Requirements, 52 pages.
3GPP TS 24.008 V10.1.0, Dec. 2010, 3rd Generation Partnership Project; Technical Specification Group Core Network and Terminals; Mobile radio interface Layer 3 specification; Core network protocols; Stage 3, (Release 10), 625 pages.
3GPP TS 26.268 V9.3.0, Dec. 2010, 3rd Generation Partnership Project; Technical Specification Group Services and System Aspects; eCall Data Transfer; In-band modem solution; ANSI-C reference code (Release 9), Global System for Mobile Communications, 26 pages.
3GPP TS 26.269 V9.2.0, Dec. 2010, 3rd Generation Partnership Project; Technical Specification Group Services and System Aspects; eCall Data Transfer; In-band modem solution; Conformance testing (Release 9), Global System for Mobile Communications, 17 pages.

* cited by examiner

RELAYING A PRIVATE EMERGENCY POINT TO A PUBLIC EMERGENCY POINT

CROSS REFERENCE TO RELATED APPLICATION(S)

This application is a 35 U.S.C. §371 National Phase Entry Application from PCT/EP2011/051067, filed Jan. 26, 2011, designating the United States, the disclosure of which is incorporated herein in its entirety by reference.

TECHNICAL FIELD

The present invention relates to a method for relaying, by an in-vehicle emergency system, a private emergency point of a vehicle to a public emergency point that is handling an emergency of the vehicle in which the in-vehicle emergency system is incorporated. The invention furthermore relates to the in-vehicle emergency system, to the public emergency point handling vehicle emergency calls and to the private emergency point.

BACKGROUND

The European Commission (EC) aims at a common Pan-European emergency call system, named "eCall". eCall is based on the existing emergency call system (112 and E112) complemented with some new features. One of these features is that the eCall can be generated automatically at a car crash (e.g. triggered by airbag sensors) or manually by passengers pressing an emergency button. Another feature is that the in-vehicle emergency system (IVS) establishes an emergency voice call to the short number 112 providing additional routing information through the so-called "service category" information element (SC-IE). This SC-IE is a three-octet parameter (see 3GPP TS24.008) and contains two eCall-specific flags (bit 6 and bit 7 of 1 . . . 8; 8=MSB) that allow differentiated routing by the mobile network according to:
bit 7-bit 6:
00b: normal emergency call
01b: manually triggered eCall
10b: automatically triggered eCall
11b: undefined According to another feature the IVS sends additional data to the public safety answering point (PSAP), also called public emergency point hereinafter, containing information about the accident, such as position, time stamp, car type, etc. These data are currently termed "minimum set of data" (MSD) with minimum indicating that additional data may follow in future specifications.

Furthermore, the current 3GPP standards define a specific inband modem for eCall to transmit this MSD from the in-vehicle emergency system to the public emergency point. This inband modem is designed to transfer exactly 140 octets from the in-vehicle emergency system to the public emergency point, but only a few commands from the public emergency point to the in-vehicle emergency system. No data can be sent from the public emergency point to the vehicle emergency system.

This inband modem has been criticized as being too inflexible, not future proof and as to costly for deployment due to the risk that the existing mobile and wireline networks may need to be modified to allow these inband modem to operate all over Europe.

Figure 5:
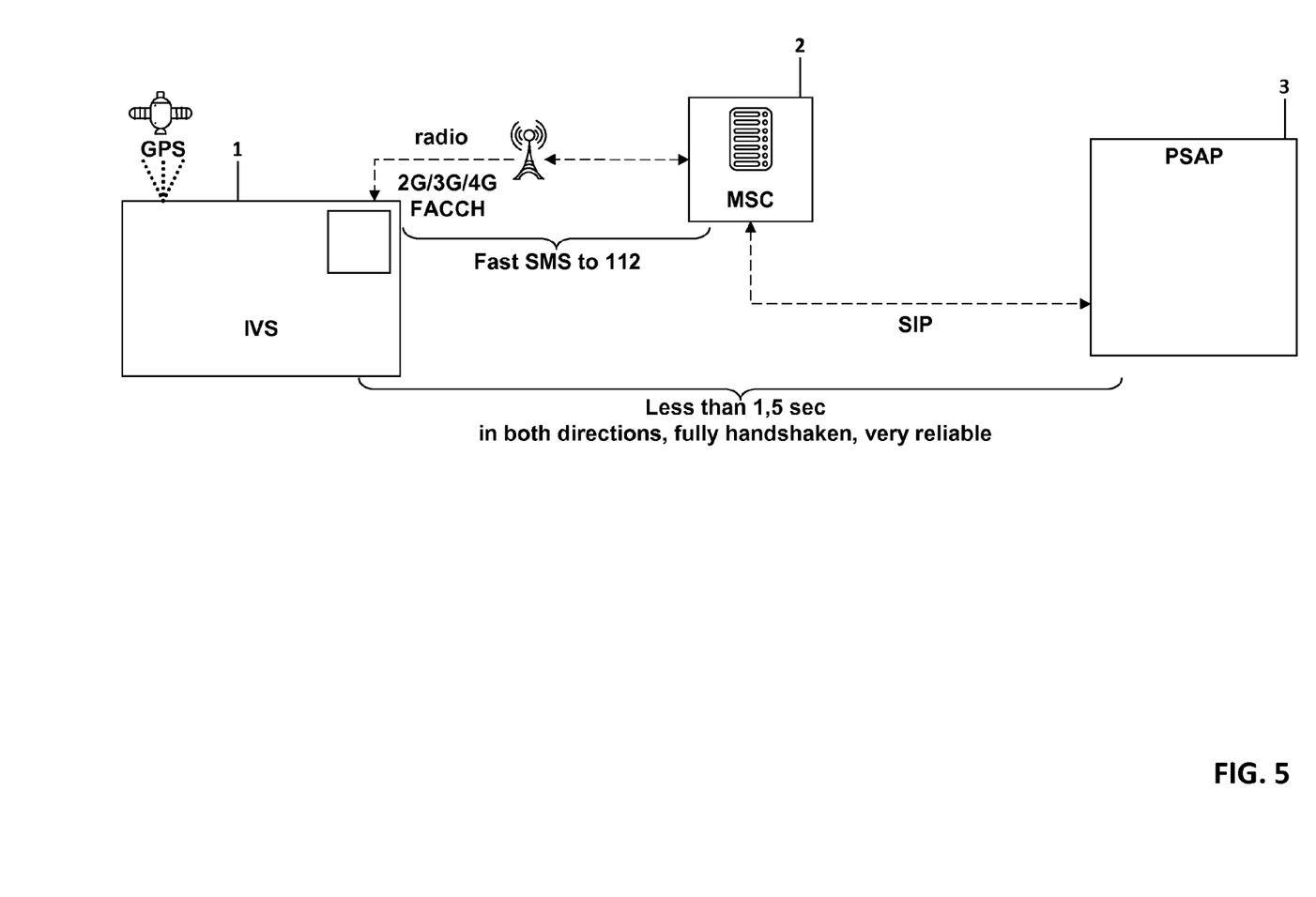
FIG. 5 shows a block diagram of the known eSMS solution.

The applicant has therefore developed an alternative method to transmit the MSD and all future eCall data from the in-vehicle emergency system to the public emergency point by means of a modified SMS protocol, termed "eSMS". FIG. 5 shows a block diagram of the known eSMS solution. The in-vehicle emergency system (IVS) 1 is shown on the left side. It contains the necessary logic and sensors for the eCall triggering and determining of the position (e.g. via GPS). It also contains a GSM radio modem chipset supporting at least voice calls and SMS. The chipset is slightly modified to include the service category IE as required by the European Commission and it contains in addition, specifically for eSMS, small modifications for a fast transmission of the SMS during the time when the voice call exists.

The Serving MSC 2 in the middle contains the mentioned routing tables for the Emergency Voice call (not shown). In addition the MSC 2 is slightly modified to evaluate the Service Category IE for routing (as required by EC).

Further the MSC 2 is modified allowing a fast transfer of the SMS in GSM and for filtering the eSMSs out of the millions of normal SMS (see more below).

The PSAP 3 on the right side contains the usual equipment for handling the emergency voice call (not shown).

In addition the PSAP 3 has an IP-Interface, which is usually necessary for many good reasons, i.e. Inter-PSAP-communication, communication between PSAP and the various rescue teams (police, fire brigade, ambulance, helicopter service and more). It is assumed that an eCall-equipped PSAP will anyway have an IP-interface.

For eSMS an "Virtual Private Network Tunnel" (VPN-Tunnel) is established on a permanent basis. The MSC and PSAP exchange eCall related data through this VPN tunnel.

The IVS 1 uses standard, available AT-Commands (e.g. according to ITU-T standard V.250) to trigger the emergency voice call and to send and receive the SMS to and from the GSM chip set within the vehicle.

The existing signaling channels of the mobile network (dashed lines) are used for eCall Data transfer.

eSMS is a normal SMS with SMS-Service-Center=112;

eSMS is running fast over the existing GSM signaling channel (<1.5 sec from IVS 1 to PSAP 3) by using the existing FACCH (Fast Associated Control Channel). The FACCH uses "frame stealing", i.e. it replaces when needed a speech frame by a FACCH frame. This is performed comparably rare and is therefore not audible. By this frame stealing the eSMS gets automatically the same high priority in the radio network as the emergency voice call.

The MSC filters the eSMS (remember: SMS-SC=112) out of the masses of normal SMS and sends the eCall Data directly and fast via secured IP to the PSAP.

Like the MSC routes the voice path to the next local PSAP, it also routes the eCall-Data to the same local PSAP or a central eCall-Data-Server. The choice of architecture is left to the PSAP-organization(s).

The correlation between Voice Call and eCall-Data is based in the phone number of the IVS. It may be noted here that the Serving MSC adds the IVS-number in both cases: to the Voice call (as originating number sent to the PSAP) and in the SMS (as originating number send to the PSAP in the SIP Messages). So the IVS-Number can not different between voice and SMS (SIP).

Besides this public Pan-European eCall Initiative, driven by the EC, so-called Third Party eCall Services or private emergency points exist for several years. These private emergency points can be considered as a private version of emergency services. They are in general advanced with respect to the details of crash data that are sent from the in-vehicle emergency system to the private emergency point. The majority of these private eCall systems uses standard SMS for data transmission.

These private emergency points are profit-oriented and not free of charge, but they have a high potential to drive research and find solutions for better crash analysis and more precise crash data, and it is expected that they will always provide advanced services compared to the free-of-charge public eCall service.

The current public eCall standard has the drawback that the defined inband modem cannot send any data from the public emergency point to the in-vehicle emergency system. Even if the standard was enhanced to allow data exchange in both directions, the nature of inband transmission would always be limiting, because it interrupts the voice communications for a substantial amount of time and its usage must therefore be constrained to a minimum.

The most important benefit of the public eCall standard is that is has support by the mobile networks to find the next local public emergency point based on the actual position of the in-vehicle system when setting up the emergency voice call. The mobile networks, more specifically the mobile switching centers (MSCs) of these networks, are able to identify the radio cell where an emergency voice call is initiated and have hand administered routing tables which contain the telephone numbers of the next local public emergency point. These tables are always up-to-date, as the public authorities take care to update these tables in close corporation with the mobile network operators. The MSC addressed public emergency point may divert the incoming eCall based on the service category or other information, or it may forward the eCall to another PSAP for various internal reasons, for example due to local overload. It is therefore not obvious for the in-vehicle emergency system which public emergency point and which specific human person within the public emergency point is handling the call.

The existing private emergency points have the problem that they do not have access to these routing tables and cannot easily know the next local public emergency point. They need costly methods to keep the private emergency point lists up-to-date somehow. Even if they managed this problem, they would still have not insight into the public emergency point internal diversion or forwarding.

SUMMARY

It therefore is of high public and private interest to find technical solutions for combining the services of public and private emergency points for the benefit of all, taking the profit-oriented basis of the private emergency points into account or in other words a need exists to combine the services of public and private emergency points for a specific emergency event.

This need is met by the features of the independent claims. In the dependent claims preferred embodiments of the invention are described.

According to a first aspect a method for relaying, by an in-vehicle emergency system, a private emergency point of the vehicle to a public emergency point that is handling an emergency of the vehicle in which the in-vehicle emergency system is incorporated is provided. The public emergency point depends on the location of the emergency and the method comprises the steps of receiving a message from a call control node of a mobile communications network in response to an emergency call initiated by the in-vehicle emergency system, the message containing contact information of the public emergency point. The received contact information of the public emergency point is then transmitted by the in-vehicle emergency system to the private emergency point. The in-vehicle emergency system receiving the contact information of the public emergency point can therefore transmit this information to the private emergency point and can thus play the role of a relay node. When the private emergency point is aware of the public emergency point, the private emergency point can contact the public emergency point and provide additional information to the public emergency point.

In one embodiment the received message is received by the in-vehicle emergency system from the public emergency point via the call control node in response to an emergency call of the in-vehicle emergency system to the public emergency point, the contact information including the contact information of the human operator handling the emergency call. The message including the contact information can be generated by the call control node, e.g. MSC, or by the public emergency point. If the message is generated by the public emergency point itself, the contact information can be more specific by directly including the human operator handling the emergency call.

The invention furthermore relates to a method for relaying, by the in-vehicle emergency system, a private emergency point of the vehicle to the public emergency point that is handling the emergency of the vehicle in which the in-vehicle emergency system is incorporated. The public emergency point depends on the location of the emergency and the method comprises the step of transmitting an emergency call to the private emergency point. Furthermore, a response message is received from the private emergency point including a contact information of the private emergency point. This information, the received contact information, is then transmitted to the public emergency point. The public emergency point is then able to contact the private emergency point in order to see whether additional information is available for the emergency.

The invention furthermore relates to an in-vehicle emergency system configured to relay the private emergency point of the vehicle to the public emergency point that is handling the emergency of the vehicle in which the in-vehicle emergency system is incorporated. The system comprises a receiver configured to receive a message from a call control node of a mobile communications network in response to an emergency call initiated by the in-vehicle emergency system. the message containing contact information of the public emergency point. Furthermore, a transmitter is provided configured to transmit the received contact information of the public emergency point to the private emergency point of the vehicle.

The invention furthermore relates to the in-vehicle emergency system comprising a transmitter configured to set up an emergency call to the private emergency point, the in-vehicle emergency system furthermore comprising a receiver configured to receive a response message from the private emergency point in response to the emergency call initiated by the in-vehicle emergency system. The response message contains contact information of the private emergency point, and the transmitter is furthermore configured to transmit the received contact information of the private emergency point to the public emergency point. In this embodiment the contact information of the private emergency point is transmitted to the public emergency point so that the public emergency point can directly contact the private emergency point.

The invention furthermore relates to a public emergency point handling vehicle emergency calls comprising a receiver configured to receive an emergency call of the in-vehicle emergency system. Furthermore, a processing unit is provided determining contact information of the public emergency point and incorporating the contact information into a response message transmitted back to the in-vehicle emergency system. Furthermore, a transmitter is provided configured to transmit the response message to the in-vehicle emergency system.

Furthermore, the invention relates to the private emergency point comprising a receiver configured to receive an emergency call of an in-vehicle emergency system. The private emergency point furthermore contains a processing unit configured to determine contact information of the private emergency point and incorporating the contact information into a response message transmitted back to the in-vehicle emergency system. The private emergency point furthermore contains the transmitter configured to transmit the response message back to the in-vehicle emergency system.

BRIEF DESCRIPTION OF THE DRAWINGS

The invention will be described in further detail with reference to the accompanying drawings, in which.

DETAILED DESCRIPTION

The present invention will be described in further detail with reference to FIG. 1, where a in-vehicle emergency system 10 is shown that can exchange data via a call control node, such as a MSC 30 with a public emergency point or public safety answering point PSAP 40 and with a private emergency point 60, also called Private eCall Service Center. The present invention is based on the fact that there is a fully bidirectional data channel between the public emergency point 40 and the IVS 10. The IVS plays the role of a relay node allowing either the private emergency point 60 to directly contact the public emergency point 40 or vice versa. The IVS 10 can provide the connection data of the public emergency point 40 to the private emergency point 60, or the IVS 10 can provide the contact data of the private emergency point 60 to the public emergency point 40. In both embodiments a direct connection between the public and the private emergency points can be set up.

A first operating mode will be described in connection with FIG. 1. An IVS 10 incorporated into a vehicle (not shown) has a subscription to a private eCall service provider in the country where the vehicle was bought. By way of example in the case of a German vehicle a subscription to a private emergency point 60 located in Germany exists. The vehicle may now be traveling in another country (e.g. Norway) and has an emergency case there. Calling 112 will connect the IVS 10 with the public emergency point in that country.

Figure 1:
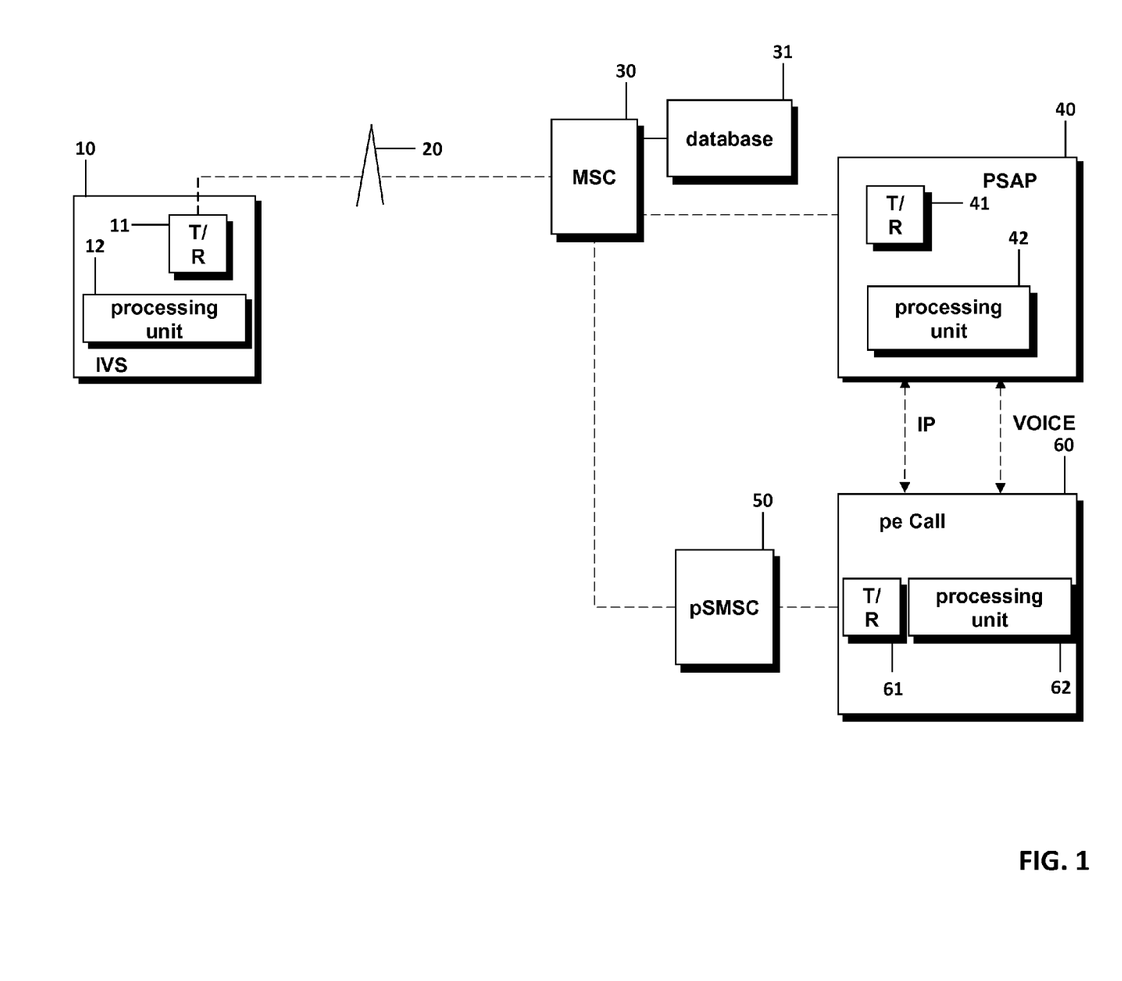
FIG. 1 shows a schematic overview of how the in-vehicle emergency system plays the role of relaying a public to a private emergency point.

In the embodiment of FIG. 1 eSMS is used for connecting the different entities together. eSMS has the advantage that it is a fully bidirectional data channel meaning that data can be sent from the IVS 10 to the public emergency point 40 and vice versa. Further, it takes advantage of the fact that eSMS does de facto not disturb the voice communication and is a fully parallel data exchange in the background. At setup of the emergency call, when the emergency call is emitted from the vehicle via a base station subsystem 20 to the serving MSC 30, the MSC identifies the radio server from where the emergency call originates and contacts a database 31 to retrieve the contact information of the public emergency point 40 to which the call should be forwarded. The database contains routing tables in which the telephone numbers of the next local PSAP 40 is stored. The USC sets up the emergency call to the best located PSAP. The addressed public emergency point 40 forwards the eCall to a specific human operator. The IVS 10 furthermore sends in addition the eCall data to the public emergency point 40. A first acknowledgement that the MSC was contacted successfully happens probably before the human operator is identified and has accepted the voice call. This is necessary to guarantee fast and robust transfer of these emergency data.

The emergency concept accelerates the transmission of SMS for eCall or any other purpose by a factor of 10 in a GSM radio network. This can be used with advantage for the private emergency point 60 to exchange the private eCall services with the private emergency point 60. Soon after the emergency voice call is in the alerting phase, the eSMS and the private SMS can both be sent at high speed and low transmission time. This fast SMS is also very reliable and robust against radio errors. When the human operator within the PSAP 40 now has taken the voice call, an acknowledgement shall be sent from the public emergency point 40 to the IVS 10 and this time it shall contain the personal connection data of the operator, i.e. the personal telephone number of the human operator in the emergency point 40. In addition, also the IP address and UDP port of the specific human operator station may be transmitted to the IVS 10. Furthermore, the geographical location of the PSAP 40, the name of the PSAP organization, and capabilities of the PSAP 40 may be transmitted.

These connection data, once known to the IVS 10, can be relayed to the private emergency point 60 which then could immediately contact the public emergency point and share the specific private information with it. In addition, the private emergency point could identify a better public emergency point, e.g. because it knows the accident details better and knows that a helicopter for fast rescue is necessary before the addressed public emergency point has found this out.

Referring back to the example of the IVS traveling in a foreign country, such as Norway, the calling of 112 will connect the IVS 10 to the Norwegian public emergency point 40 and the public emergency point 40 will very quickly have the eCall data via FACCH (Fast Associated Control Channel) and SIP-message. The German passengers may not be able to speak Norwegian and the human operator may not be able to speak the passenger's language. A second set of data can be sent by the IVS 10 via FACCH and the traditional MAP (Mobile Application Part) signaling via the corresponding MSC 50 to the private emergency point 60 owned by the private eCall service provider. This private center gets the connection data of the current public emergency point and can directly contact the public emergency point 40. A three-party-conference-call may be set up and the language problem may be solved by the private eCall service provider who may be able to speak German and Norwegian. In the embodiment shown in FIG. 1 only the functional units needed for the understanding of the present invention are shown. By way of example the IVS 10 comprises a processing unit 12 processing the requests received from the public or private emergency point via the transmitter/receiver 11. The transmitter/ receiver 11 transmits and receives the contact information allowing a direct connection between the public and the private emergency point. In the same way the public emergency point comprises a processing unit 42 determining the contact information in response to the request received from the IVS 10, the contact information containing inter alia the human operator handling the emergency call. The contact information is transmitted via transmitter/receiver 41 back to the IVS 10. In the same way the private emergency point comprises a transmitter/receiver 61 and a processing unit 62 determining the contact information of the private emergency point in response to a received request and incorporating the contact information into a response message transmitted via the transmitter 61. In FIG. 1 only the functional entities are shown which are necessary for the understanding of the present invention. It should be understood that the different modules 10, 20, 30, 40, 50 and 60 contain additional functional entities which are not shown in the Fig. for the sake of clarity.

The functional entities shown may be incorporated by hardware or software processed by one or more processing units. Furthermore, a combination of hardware and software may be used to carry out the functions of the different entities described above.

As described above, the IVS 10 transmits a contact information of the public emergency point to the private emergency point. In general terms, the contact information can contain at least one of the following pieces of information: telephone number of the public emergency point, telephone number of the human operator handling said emergency call, IP address of the public emergency point, geographical location of the public emergency point, name of the organization operating the public emergency point, and capabilities of the public emergency point.

For a fast and reliable transmission of the contact information a signaling channel of the mobile communications network via which the emergency call is transmitted may be used. More preferably, the contact information can be received and transmitted in an application layer of a protocol used in the signal channel for signaling in the mobile communications network.

One possibility to transmit and receive the contact information is the Fast Associated Control Channel FACCH of the mobile communications network. Another possibility is a short message system SMS of the mobile communications network, a modified SMS across the FACCH of the mobile communications network or via the data channel of the mobile communications network. Another possibility is that the contact information is received and transmitted by the in-vehicle emergency system using a session initiation protocol, SIP. In this embodiment the SIP is also used between the IVS 10 and the PSAP 40.

In another embodiment the IVS 10 first informs the private emergency point 60, gets from there the connection data of the private emergency point and then informs the public emergency point which then understands that more important data are available at the private emergency point.

Figure 2:
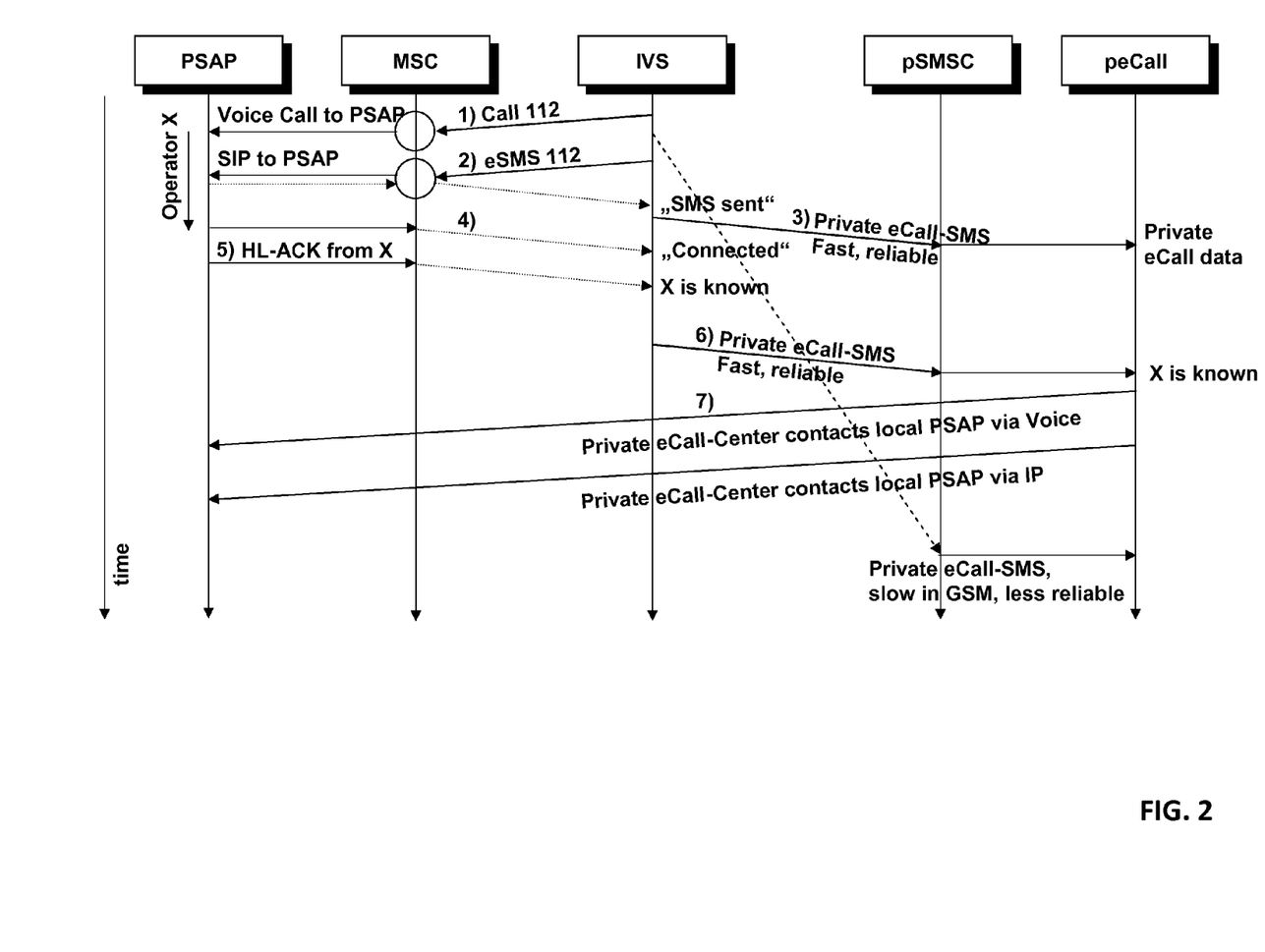
FIG. 2 shows a state diagram of the message exchange between the different entities involved in the exchange of contact information.

In connection with FIG. 2 an embodiment is described in more detail in which the IVS 10 first contacts the public emergency point and in which the provided contact information is transmitted to the private emergency point which can then directly contact the public emergency point.

In the embodiment shown the IVS is shown in the middle, as it plays the role of a relay function between the public and private emergency points. As time is also an issue in emergency calls, the time needed for transmitting the different messages is also shown, the time running from top to bottom in FIG. 2. Some transactions take some noticeable time. When an accident happens or when a SOS button is pressed, then the IVS 10 first of all tries to establish an emergency voice call to the next local PSAP 40. The IVS does not know which PSAP is responsible for the area where it is currently roaming, so the IVS indicates "112" to the mobile network and also sends the service category IE (information element). The serving MSC translates this by table lookup or other means to the appropriate PSAP number. This MSC action is indicated by the first circle shown at step 1. The MSC further cares that the call is treated as a high priority call by the mobile radio network, i.e. if necessary another normal voice call may be terminated by the radio network to give room for the emergency call. The addressed PSAP equipment gets the emergency call from the MSC and diverts the call to the free workstations of the human operators inside the PSAP. If none of the available workstations are free, meaning that the PSAP is fully loaded, the call may be put into a waiting loop or may be forwarded to another PSAP. The IVS and the MSC have no insight into these actions. Furthermore, a third party service center, such as the private emergency point, cannot know this.

Once a free Work Station is found the bell is ringing at the PSAP-side (alerting phase). In that moment the IVS starts to send the eSMS via the fast way to the Serving MSC (step 2). The fast channel exists immediately when the radio channel is established (when the ringing starts). The eSMS has no destination address, but the SMSC-Number is set to "112".

The MSC filters the eSMS and sends the content via SIP Message to the appropriate PSAP. This MSC-action is indicated with the second circle. The PSAP-receiver immediately acknowledges the receipt and the MSC returns this acknowledgement to the IVS (dashed lines). In most cases the eCall Data are at the PSAP side before the human operator has accepted the emergency call.

Once the operator accepts the call the IVS gets a notification "connected" (step 4) and IVS and PSAP can talk to each other. Automatically the PSAP-equipment sends an "Higher-Layer Acknowledgement" (HL-ACK) to the IVS, containing the detailed connection data of the active human operator (telephone number, IP address, etc). Shortly after the first words have been exchanged the IVS-equipment knows these connection details ("X is known") (step 5).

The IVS can silently now send in step 6 an SMS to the private eCall Service Center, together with its private eCall Data. This eCall SMS contains the contact data received from the public emergency point. Alternatively the IVS can inform the private eCall Service center already (e.g. after "SMS sent") to pre-warn the private eCall Service, but at that time without the PSAP-connection data (step 3).

As soon as the private PSAP has the connection data it may contact the human operator in the public PSAP per voice call or IP connection (step 7).

A normal SMS from the IVS to the private eCall Service Center as it is used today, takes much longer as shown by the dashed line from IVS to the private emergency point and is maybe less reliable.

Of course also the other variant is possible: the IVS informs first the private eCall Service Center and gets first their connection data back. Then the IVS sends these connection data to the public eCall Service Center and they start connecting to the private Center. The invention covers both variants.

In the embodiment described above an emergency call is initiated by the in-vehicle emergency system to the public emergency point, the message being received via the call control node from the public emergency point. In this embodiment the received message can be an acknowledgement message from the public emergency point in response to the emergency call.

The emergency call may be a voice call or a data message or a data transmission session. Furthermore, the emergency call may comprise both voice and data.

In another embodiment which will be described in further detail with FIG. 4, the emergency call can be a manually or automatically triggered emergency call for the private emergency point 60, wherein the in-vehicle emergency system 10 receives the request from the private emergency point to retrieve contact information of the public emergency point, the in-vehicle emergency system initiating an emergency call to the public emergency point.

In another embodiment, which will be described in further detail below in connection with FIG. 3, the emergency call can also be a manually or automatically triggered emergency call for the private emergency point, wherein the in-vehicle emergency system receives a request from the private emergency point to retrieve contact information of the public emergency point. In this context the in-vehicle emergency system can request the contact information of the public emergency point from the call control node or the public emergency point without an emergency voice call to the public emergency point being set up by the in-vehicle emergency system with the request. The requested contact information is then received from the call control node or the public emergency point and the requested contact information is transmitted to the private emergency point.

Figure 3:
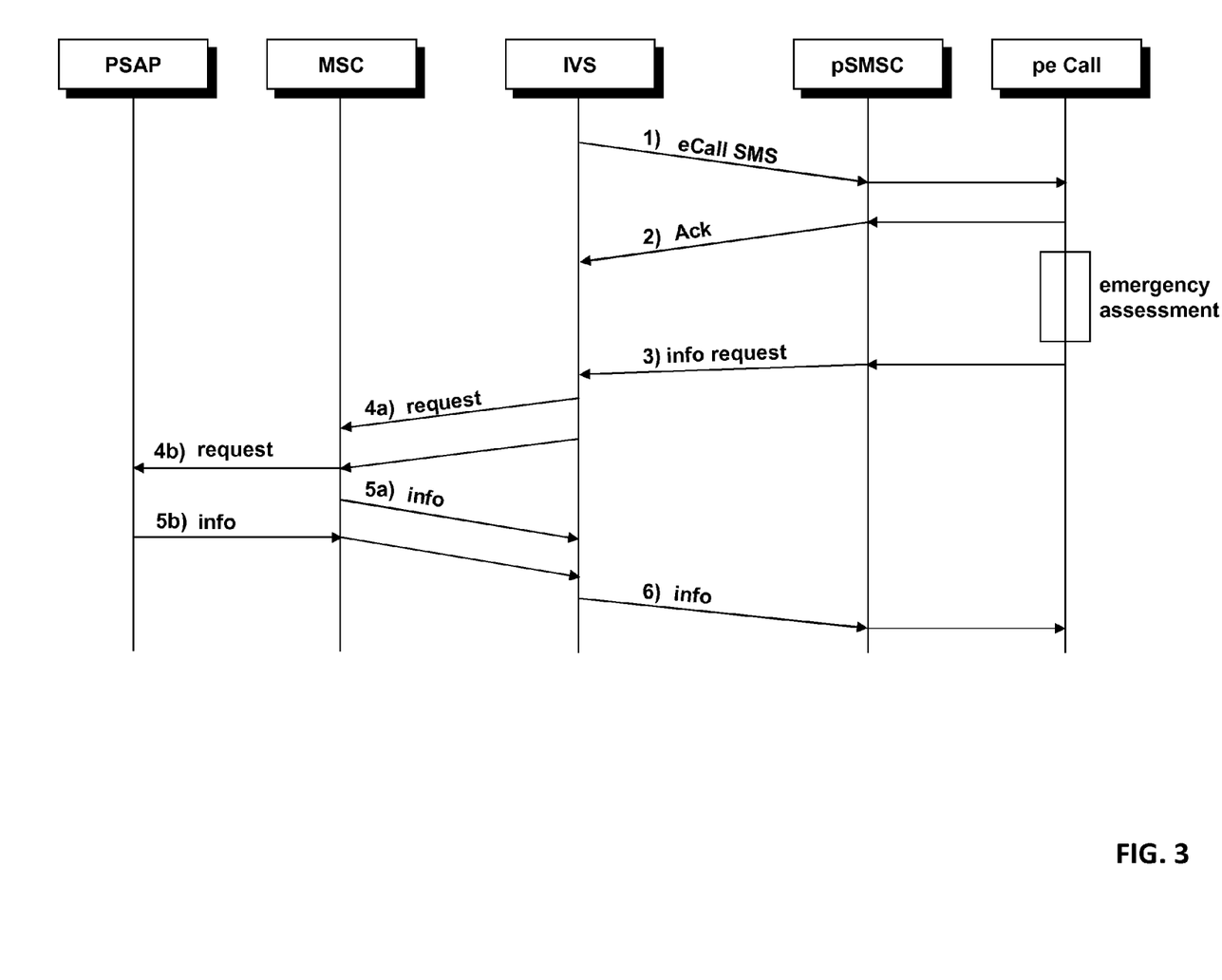
FIG. 3 shows a state diagram of another embodiment of informing the private emergency point of the contact information of the public emergency point.

In connection with FIG. 3 an embodiment is disclosed where the in-vehicle system first contacts the private emergency point which then assesses the emergency using the information provided by the vehicle. In the first step of FIG. 3 an eCall SMS is sent from the IVS 10 via the private MSC 50 to the private emergency point 60 which then transmits back an acknowledgement message in step 2. The private emergency point then checks the provided information and assesses how severe the emergency is. If the private emergency point comes to the conclusion that help will be necessary from the public emergency point located closer to the vehicle, an information request message is sent from the private emergency point to the in-vehicle system (step 3). The IVS 10 can then itself request the needed information either from the MSC where the information of the public emergency points are stored in annexed databases (step 4a) or the IVS can directly contact the public emergency point without a voice call being set up requesting contact information. In step 5a the requested information is received by the IVS from the MSC, whereas in step 5b the requested information is received from the public emergency point. In step 6 the received contact information is then transmitted to the private emergency point, which can then contact the public emergency point directly, if needed.

Figure 4:
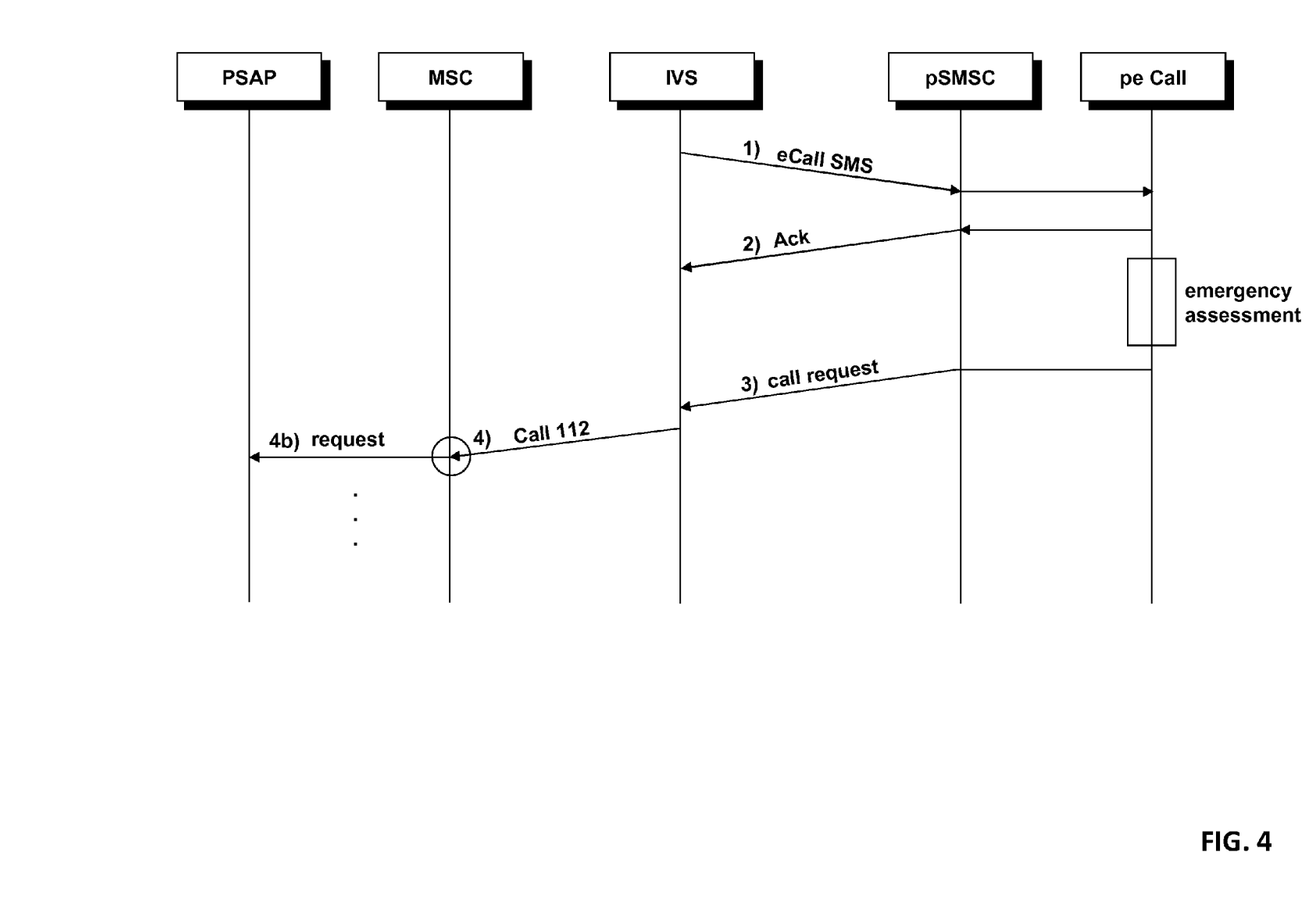
FIG. 4 shows a state diagram showing in more detail the message exchange between the different entities where the private emergency point first assesses whether the public emergency point has to be contacted.

In the embodiment of FIG. 4 the private emergency point can ask via the IVS to establish a contact to the public emergency point. In the embodiment shown in FIG. 4 the IVS transmits in step 1 an emergency call to the private emergency point, the private emergency point transmitting back an acknowledgement message in step 2. Based on the provided information contained in an emergency call, the private emergency point can assess how severe the accident or the situation is. The private emergency point can then transmit a call request message to the IVS (step 3). Based on the call request the IVS then sets up an emergency call to the public emergency point in step 4. This step 4 then corresponds to step 1 shown in FIG. 2, the flow chart continuing as shown in FIG. 2 after step 1.

In the embodiment shown the contact information is often provided by a eSMS. In another embodiment a direct SIP message communication between the IVS and the public emergency point is possible. In another embodiment the contact information may also be transmitted using the inband connection. However, this means an interruption of the voice channel. However, the possibility to connect the public and private emergency points together more than compensates this drawback.

Summarizing, the present invention allows to combine benefits of the public emergency points with the benefits of the private emergency points by building a connection relay between both emergency points through the in-vehicle emergency system. One possibility for the contact information transmission is eSMS providing a fast and reliable two-way communication channel between the in-vehicle system and the public emergency point in a fast and reliable two-way communication channel between the vehicle and the private emergency point.

The invention claimed is:

1. A method for relaying, by an in-vehicle emergency system, a private emergency point of the vehicle to a public emergency point that is handling an emergency of the vehicle in which the in-vehicle emergency system is incorporated, the public emergency point depending on the location of the emergency, the method comprising the steps of:
   receiving a message from a call control node of a mobile communications network in response to an emergency call initiated by the in-vehicle emergency system, the message containing contact information of the public emergency point, and
   transmitting the received contact information of the public emergency point to the private emergency point.

2. The method according to claim 1, wherein the received message is received by the in-vehicle emergency system from the public emergency point via the call control node in response to an emergency call of the in-vehicle emergency system to the public emergency point, the contact information including the contact information of a human operator handling said emergency call.

3. The method according to claim 1, wherein the contact information contains at least one of the following pieces of information: telephone number of the public emergency point, telephone number of the human operator handling said emergency call, IP address of the public emergency point, geographical location of the public emergency point, name of the organisation operating the public emergency point, capabilities of the public emergency point.

4. The method according to claim 1, wherein the contact information is received and transmitted in a signalling channel of the mobile communications network via which the emergency call is transmitted.

5. The method according to claim 4, wherein the contact information is received and transmitted in an application layer of a protocol used in the signalling channel for signalling.

6. The method according to claim 4, wherein the contact information is received and transmitted by the in-vehicle emergency system via a Fast Associated Control channel, FACCH, of the mobile communications network, or via a short message system, SMS, of the mobile communications network, or via a modified SMS across a Fast Associated Control channel, FACCH, of the mobile communications network, or via a Data Channel of the mobile communications network.

7. The method according to claim 4, wherein the contact information is received and transmitted by the call control node via IP communication, and wherein the IP communication uses a SIP Message.

8. The method according to claim 4, wherein the contact information is received and transmitted by the in-vehicle emergency system using a Session Initiation Protocol.

9. The method according to claim 2, wherein the emergency call is a manually or automatically triggered emergency call for the private emergency point, wherein the in-vehicle emergency system receives a request from the private emergency point to retrieve contact information of the public emergency point, the in-vehicle emergency system initiating an emergency call to the public emergency point in response to the request from the private emergency point.

10. The method according to claim 1, wherein the emergency call is a manually or automatically triggered emergency call for the private emergency point, wherein the in-vehicle emergency system receives a request from the private emergency point to receive contact information of the public emergency point, the method further comprising the steps of:
   requesting, by the in-vehicle emergency system, the contact information of the public emergency point from the call control node or the public emergency point without an emergency call to the public emergency point being set up by the in-vehicle emergency system with the request,
   receiving the requested contact information from the call control node or the public emergency point, and
   transmitting the requested contact information to the private emergency point.

11. A method for relaying, by an in-vehicle emergency system, a private emergency point of the vehicle to a public emergency point that is handling an emergency of the vehicle in which the in-vehicle emergency system is incorporated, the public emergency point depending on the location of the emergency, the method comprising the steps of:
   transmitting an emergency call to the private emergency point,
   receiving a response message from the private emergency point including a contact information of the private emergency point,
   transmitting the received contact information of the private emergency point to the public emergency point.

12. An in-vehicle emergency system configured to relay a private emergency point of the vehicle to a public emergency point that is handling an emergency of the vehicle in which the in-vehicle emergency system is incorporated, the public emergency point depending on the location of the emergency, the system comprising:
   a receiver configured to receive a message from a call control node of a mobile communications network in response to an emergency call initiated by the in-vehicle emergency system, the message containing contact information of a public emergency point, and
   a transmitter configured to transmit the received contact information of the public emergency point to the private emergency point of said vehicle.

13. The in-vehicle emergency system according to claim 12, wherein the receiver is configured to receive the contact information in a signalling channel of the mobile communications network via which the emergency call is transmitted, the transmitter being configured to transmit the received contact information in the signalling channel of the mobile communications network.

14. An in-vehicle emergency system configured to relay a private emergency point of the vehicle to a public emergency point that is handling an emergency of the vehicle in which the in-vehicle emergency system is incorporated, the public emergency point depending on the location of the emergency, the system comprising:
   a transmitter configured to setup an emergency call to the private emergency point and to send a request message to the private emergency point
   a receiver configured to receive a response message from the private emergency point in response to the emergency call initiated by the in-vehicle emergency system, the response message containing contact information of the private emergency point, wherein the transmitter is further configured to transmit the received contact information of the private emergency point to the public emergency point.

* * * * *